(12) United States Patent
Solgaard et al.

(10) Patent No.: US 10,946,579 B2
(45) Date of Patent: Mar. 16, 2021

(54) DEVICE FABRICATION USING 3D PRINTING

(71) Applicant: The Board of Trustees of the Leland Stanford Junior University, Stanford, CA (US)

(72) Inventors: Olav Solgaard, Stanford, CA (US); Nina Vaidya, Stanford, CA (US); Thomas Eugene Carver, Stanford, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 186 days.

(21) Appl. No.: 15/771,893

(22) PCT Filed: Dec. 14, 2016

(86) PCT No.: PCT/US2016/066650
§ 371 (c)(1),
(2) Date: Apr. 27, 2018

(87) PCT Pub. No.: WO2017/106341
PCT Pub. Date: Jun. 22, 2017

(65) Prior Publication Data
US 2018/0319110 A1 Nov. 8, 2018

Related U.S. Application Data

(60) Provisional application No. 62/267,175, filed on Dec. 14, 2015.

(51) Int. Cl.
*G02B 3/00* (2006.01)
*B29C 64/106* (2017.01)
*B29D 11/00* (2006.01)
*B29C 64/118* (2017.01)
*B33Y 80/00* (2015.01)
(Continued)

(52) U.S. Cl.
CPC .......... *B29C 64/118* (2017.08); *B29C 64/371* (2017.08); *B29C 67/00* (2013.01); *B29C 71/04* (2013.01); *B29D 11/00* (2013.01); *B29D 11/00442* (2013.01); *B29D 11/00884* (2013.01); *B33Y 40/00* (2014.12); *B33Y 80/00* (2014.12);
(Continued)

(58) Field of Classification Search
None
See application file for complete search history.

(56) References Cited

U.S. PATENT DOCUMENTS 4,332,861 A 6/1982 Franz et al.
5,264,061 A 11/1993 Juskey et al.
(Continued)

OTHER PUBLICATIONS

Cech, J. et al. (2013) "Surface Roughness Reduction Using Spray-Coated Hydrogen Silsesqioxane Reflow," Applied Surface Science 280:424-430.
(Continued)

*Primary Examiner* — Dawayne Pinkney
(74) *Attorney, Agent, or Firm* — Foley & Lardner LLP

(57) ABSTRACT

A fabrication process includes: 1) forming an object by 3D printing; 2) smoothing the object by applying a gel to the object to coat at least a portion of the object with a film of the gel; 3) subjecting the object coated with the film to vacuum; and 4) curing the film to yield the object coated with the cured film.

20 Claims, 9 Drawing Sheets

(51) Int. Cl.
*B33Y 40/00* (2020.01)
*B29C 67/00* (2017.01)
*B29C 64/371* (2017.01)
*B29C 71/04* (2006.01)
*B29L 11/00* (2006.01)

(52) U.S. Cl.
CPC ............... *B29L 2011/0016* (2013.01); *B29L 2011/0058* (2013.01)

(56) References Cited

U.S. PATENT DOCUMENTS

| | | | | |
|---|---|---|---|---|
| 9,709,713 | B1* | 7/2017 | Chen | ............ G02B 23/02 |
| 2001/0036516 | A1* | 11/2001 | Schmidt | ............ C04B 41/009 |
| | | | | 427/559 |
| 2001/0043990 | A1* | 11/2001 | Chong | ............ B05D 7/02 |
| | | | | 427/320 |
| 2008/0054508 | A1 | 3/2008 | Rudmann et al. | |
| 2009/0169871 | A1 | 7/2009 | Lappalainen et al. | |
| 2010/0308509 | A1* | 12/2010 | David | ............ B29C 33/58 |
| | | | | 264/448 |
| 2015/0331186 | A1 | 11/2015 | Peltz | |
| 2015/0344682 | A1* | 12/2015 | Ganapathiappan | ........ C08J 3/12 |
| | | | | 264/401 |
| 2015/0352668 | A1 | 12/2015 | Scott et al. | |

OTHER PUBLICATIONS

Green, W. et al. "Additive Manufacturing of Reflective Freeform Optics," downloaded Dec. 14, 2016 at http://www.aspe.net/publications/Short%20Abstracts%2014SP/3903.pdf, 2 pages.

International Search Report and Written Opinion (ISA/KR) for International Application No. PCT/US2016/066650, dated Mar. 29, 2017.

International Preliminary Report on Patentability on International Application No. PCT/US2016/066650 dated Jun. 28, 2018, 7 pages.

* cited by examiner

DEVICE FABRICATION USING 3D PRINTING

CROSS-REFERENCE TO RELATED APPLICATION

This application is a national stage entry under 35 U.S.C. § 371 of International Application No. PCT/US2016/066650, filed Dec. 14, 2016, which claims the benefit of U.S. Provisional Application No. 62/267,175, filed Dec. 14, 2015, the content of each of which is incorporated herein by reference in its entirety.

BACKGROUND 3D printing is a disruptive technology in the road map of manufacturing—"print and go"—namely, design, print, and use. 3D printing is also called additive manufacturing or digital manufacturing. In 3D printing, material use can be constrained to the weight of a part that is formed, and hence there is reduced material waste. Complexity is reduced with 3D printing, and what can be designed on a computer can also be printed out (within the resolution of a printer). 3D printing is already used in consumer products, home 3D printing kits, 3D printed electronics, 3D printed orthodontic products, and even aerospace, automotive industry, intricate device packaging, microfluidics, and bio-engineering where there are stringent specifications to consider. Design can be performed in one place, and manufacturing can be performed in another. Improved surfaces, shapes with no small parts, fixtures/bolts, or other whole designs can be printed in their entirety. 3D printing has the potential to afford mass customization of consumer and scientific parts. Efficient and compact packaging of devices can be attained more readily and more precisely. The field of 3D printing paves a path towards a new age of manufacture.

It is against this background that a need arose to develop embodiments of this disclosure.

SUMMARY

Some embodiments of this disclosure relate to a fabrication process including: 1) forming an object by 3D printing; 2) applying a gel to the object to coat at least a portion of the object with a film of the gel; 3) subjecting the object coated with the film to one or more of vacuum, spinning, or plasma; and (4) curing the film to yield the object coated with the cured film.

In some embodiments, a root mean square (rms) surface roughness of the cured film is about 100 nm or less to attain an optical quality surface. In some embodiments, the rms surface roughness of the cured film is about 20 nm or less, or about 10 nm or less.

In some embodiments, forming, printing, smoothing, post-processing, or finishing the object is performed by light polymerized 3D printing or any other type of 3D printing (e.g., Stereo-Lithography, extrusion technologies, wax printers or nano-scribe) and smoothing performed using an additive substance cured on the surface of the bare 3D printed part.

In some embodiments, forming the object is performed by 3D printing with a Stereo-Lithography printer or a wax printer.

In some embodiments, the process further includes, prior to applying the gel, cleaning the object and subjecting the object to vacuum.

In some embodiments, the gel is composed of a pre-polymer based on an alkyl ester of acrylic acid. In some embodiments, the gel is a methacrylate-based gel. In some embodiments, the gel is a polymeric organosilicon or silicone. In some embodiments, the gel is a combination of two or more of the foregoing.

In some embodiments, applying the gel is performed using an applicator.

In some embodiments, applying the gel is performed by spin-coating, deposition, spaying, screen printing, dropping, dipping, or painting.

In some embodiments, subjecting the object coated with the film to vacuum is performed at a pressure of about $10^{-1}$ Torr or less.

In some embodiments, curing the film is performed by exposing the film to light or heat. In some embodiments, multiple films can be applied to the object in one or multiple stages with the same or different gels.

In some embodiments, the process further includes depositing a metal over the cured film, such that the smoothing process is compatible with vacuum and/or deposition/evaporation/coating of the metal over the part.

In some embodiments, the object coated with the cured film is a mold, and further comprising forming a molded object using the mold.

Additional embodiments of this disclosure relate to a device (e.g., an optical device) or a mold formed by the above-mentioned fabrication process.

Further embodiments of this disclosure relate to an optical device including: 1) an object; and 2) a polymer film coating the object and having a root mean square (rms) surface roughness of about 100 nm or less.

In some embodiments, the object is a 3D printed object having a rms surface roughness of at least about 5 times or at least about 10 times greater than the rms surface roughness of the polymer film.

In some embodiments, the rms surface roughness of the polymer film is about 20 nm or less, or about 10 nm or less, and the rms surface roughness of the 3D printed object is at least about 30 nm, at least about 50 nm, at least about 100 nm, at least about 500 nm, or about 1 µm or greater.

In some embodiments, the optical device further includes a metal layer coating the polymer film.

In some embodiments, the polymer film is composed of a polymer based on an alkyl ester of acrylic acid.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DESCRIPTION

Figure 1A:
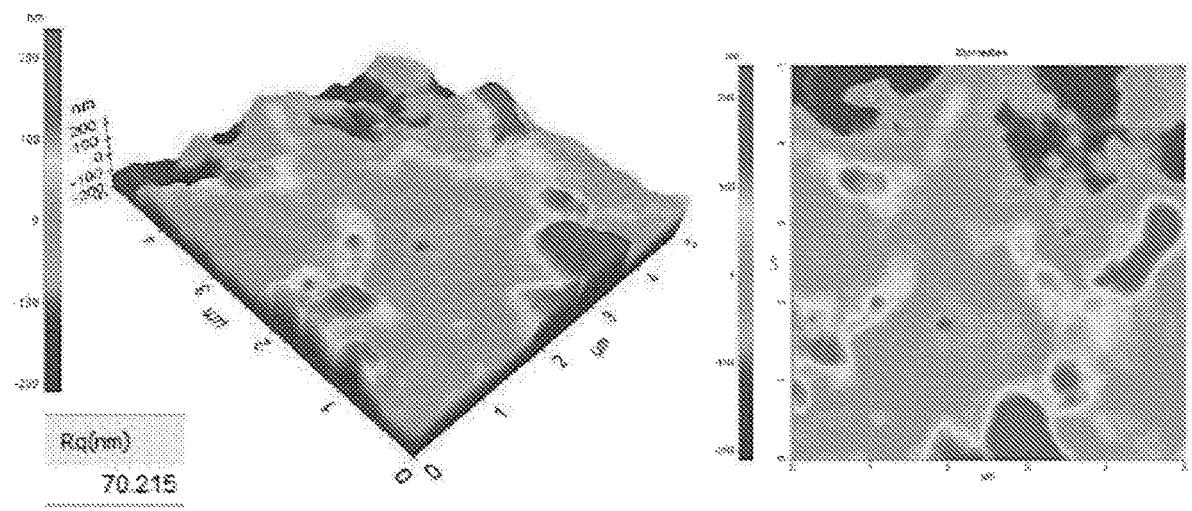
FIG. 1a: Bare 3D printed surface by Stereo-Lithography (SLA) printer (surface roughness: about 70 nm).

Optical devices have been constrained by the cumbersome, time-consuming, energy-intensive, and skill-intensive fabrication techniques to form sub-wavelength quality smooth surfaces. The traditional techniques involve: diamond cutting, lapping, machining, grinding, and polishing of traditional materials like glasses and metals. Irregular shapes in optics are much harder to form and polish. Optical devices and systems can benefit from the ability of 3D printing to form low-cost structures of nearly arbitrary shape. Optical designs can be complicated by the specification to conform to shape constraints imposed by a fabrication technology, for example, spherically polished lenses or flat imagers and shapes that can be efficiently molded and cast. Other cost driving constraints concern integration of different devices made in different materials and by different processes. It is desirable to develop more cost-effective and streamlined ways to form complex smooth surfaces, such as nanometer-scale wavelength surface smoothness even with complex shapes via 3D printing. In some embodiments of this disclosure, it is demonstrated that the use of 3D printing can attain high quality optics.

Optical devices by 3D printing, while maintaining or exceeding a surface quality of traditional techniques, can make fabrication much faster, scalable, and cheaper. For example, a piano concave or convex lens can cost above $1000 per lens. Whereas, if desired optical properties can be attained using polymers and 3D printing, this part can cost no more than a few dollars/part. Kino-form lenses are another example where the complexity of forming all the corner features and the repeated pattern can be streamlined by using 3D printing. In some embodiments of this disclosure, demonstration is made for 3D printed fabrication of mirrors, solar concentrators, and optical elements of a microscope.

An optical part or object can be designed and simulated with suitable materials and wavelengths in a ray tracing software. The shape of the part can be reproduced in a solid modeling computer-aided design tool, or can be directly imported in high resolution setting from the ray tracing software. A file format of the design tool can be converted into a .stl file via high resolution triangulation meshing. A 3D printer software accesses this .stl file and converts the shape into sliced layered sections according to the printer's resolution and stackable 3D lines. These lines/arcs/pattern of droplets/spot of filament formed each layer by various methods, for example, by a filament material laid down via an extrusion 3D printing technology via melting or sintering or a filament material cured in a bath of liquid in a light polymerized 3D printing technology, such as Stereo-Lithography (SLA) printing, laminated object manufacturing, or a drop-on-demand wax printer or nano-scribe. With this part printed, evaluation can be performed as to how well the shape of the 3D printed part compares to the digital file shape. For this analysis, a 3D scanner and a profilometer can be used. After the correct shape is formed, investigation can be performed as to how to smooth the 3D printed surface.

Once a digital file is ready, a constraint of 3D printing is the layer resolution which makes surfaces and sloping sidewalls stepped with larger dimensions than a desired sub-wavelength resolution. For example in extrusion technologies, a printer head typically lays down lines of polymer next to each other and then cross hatches over the lines. A resolution of the printer derives from the width and height of these lines, so there is a feature resolution (width and length) within a layer, and then there is also a layer resolution (height). Apart from resolution there is also the issue of finite availability of materials as a cartridge filament, including both the types of materials and the number of materials that can be used in one printout. The technologies used for 3D printing involves melting or sintering, extruding, evaporating, or curing a filament material which can be a metal/alloy or a polymer/polymer mixture, or a wax. The different 3D technologies include as follows: Direct Metal Laser Sintering (DMLS), extrusion technologies like Fused Deposition Modeling (FDM) and Fused Filament Fabrication (FFF), roll or lamination technology like Laminated Object Manufacturing (LOM), and polymerization technologies like light polymerization through SLA, or inkjet printing like drop-on-demand technologies.

In some embodiments, a gel smoothing process is developed for 3D printed optical parts, and is implemented as follows.

A 3D printed part is rinsed with water (or other solvent) and a small amount of detergent (or other surfactant) (e.g., one drop of detergent in about 500 ml of water). Then the part is washed with de-ionized (DI) water and blown dry. The part is left to substantially completely dry in a low moisture or dry environment or in an oven. Then the part is subjected to vacuum (for example, placed in a vacuum chamber at a pressure of about 1 Torr or less, about $10^{-1}$ Torr or less, about $10^{-2}$ Torr or less, or about $10^{-3}$ Torr or less) to de-gas for a few hours (time depending on the material and volume of the part).

Next, a thin film or layer of a gel (e.g., a photo-sensitive polymer mixture of the methacrylate family) is applied to the part with a fine clean dry brush (or other applicator). Spin-coating, atomized spray coating, dipping, or another coating technique also can be used.

Next, the coated part is subjected to vacuum (for example, placed in a vacuum chamber at a pressure of about 1 Torr or less, about $10^{-1}$ Torr or less, about $10^{-2}$ Torr or less, or about $10^{-3}$ Torr or less) to remove any air in gaps between a surface of the printed part and the gel, or air bubbles in the gel or the printed part. This stage allows and promotes vacuum impregnation of the gel into pores at a surface of the 3D printed part, where the vacuum causes trapped air pockets in those pores to expand into larger bubbles in the gel, which escape, and then the gel flows due to capillary action into those pores to fill them. At this stage when the gel is liquid and the bubbles have been removed, surface tension draws a surface of the gel into a smooth mirror-like surface. And since no solvent is evaporating unlike other coatings, little or no defects form on the surface of the gel.

Next, excess gel is removed by flowing away under gravity by laying the part flat on a stand and spinning the part for conformal coverage while the gel is still un-cured. Contact with the gel film is avoided, and the presence of dust/impurities is reduced in this stage.

Next, excess gel is removed by brushing at an edge frame or support which is not an active optical surface. Spinning and vacuum can be applied again for enhanced conformity before curing. A desired amount of the gel can be thick enough to substantially fully wet the surface of the 3D printed part and fill pores, and excess beyond that is allowed to flow away (or is brushed toward edges, or spun off). If there is insufficient gel, the coated part may appear lumpy or dull as there is not enough gel to smooth/cover surface imperfections. If there is just enough, the surface of the coated part may appear glassy. The surface tension of the gel is relatively high and if there is sufficient gel on the surface of the 3D printed part, the surface of the gel pulls into a mirror-like surface. The foregoing stages while the 3D printed part has the wet gel (prior to curing) can be performed in a cleanroom or in a substantially dust-free glove box for a more efficient fabrication (since dust/contaminants/particles can create defects in the form of small pock marks on the otherwise glassy surface). For example, the stages can be performed in a class 100 cleanroom (e.g., less than 100 particles larger than 0.45 microns per cubic foot of air).

Next, light (ultraviolet light) curing is performed on the film of the gel for a few minutes or seconds of time depending on the size of the part. If the part includes vertical walls or undercuts, the part may be held at different angles to allow sufficient exposure of various areas to UV light. If desired to avoid overheating the part of a smaller size, multiple shorter exposures can be done with a short cool-down time in between exposures. For example, light curing can be repeated and performed in multiple (e.g., two) stages, with each stage performed for a moderate time duration to avoid over-heating.

Then, a resulting optical device including a sub-optical wavelength smooth surface is attained and can be coated with a metal to yield a mirror or can be used as a mold or a lens, or an optical device, an opto-electronic device, a mechanical device, or a mold to create smooth parts of any kind.

This smoothing process can yield a surface roughness (e.g., measured via Atomic Force Microscopy (AFM)) down to about 2 nm in terms of a root mean square (rms) value (e.g., from a commercially available printer that is rated at a resolution of about 50.8 microns). This process in general can be used to form glossy, robust, tough, smooth-finished 3D printed devices from commercially available 3D printers and filament materials, 3D printed parts can have surfaces that are rough, particulate, fibrous, or porous, and a gel can cover this rough surface and render resulting objects as safe, water-proof, and highly smooth. More generally, this smoothing process can yield a rms surface roughness of less than about 1 micron, such as about 900 nm or less, about 800 nm or less, about 700 nm or less, about 600 nm or less, about 500 nm or less, about 400 nm or less, about 300 nm or less, about 200 nm or less, about 100 nm or less, about 80 nm or less, about 60 nm or less, about 40 nm or less, about 20 nm or less, about 10 nm or less, about 5 nm or less, and down to about 2 nm or less. In some embodiments, this smoothing process can yield a surface which is substantially free of optical defects, for example, in the form of cracks or pinholes, such that there is no greater than 1000 defects per 10,000 $\mu m^2$ of the surface, no greater than 100 defects per 10,000 $\mu m^2$ of the surface, no greater than 10 defects per 10,000 $\mu m^2$ of the surface, or no greater than 1 defect per 10,000 $\mu m^2$ of the surface. It is also contemplated that a gel can be directly be used as a filament material or in a filament bath in a 3D printer to form 3D printed, transparent smooth optical devices. Different materials and particles can be added to a printer filament material or a gel coating material to vary properties according to a desired application. For example, materials can be adjusted to make graded index films, or an electrically conductive channel or connection, or magnetic materials, insulating layers, environmentally tough/UV stable anti-yellowing coatings or radiation hardened shielding layers, piezo-electric layers, water resistant/encapsulating/toughening or top coatings—these can be multiple layers or a single layer within an object or coating/coatings). Example applications of embodiments of this disclosure include 3D printing, where a gel can be a finishing stage for a variety of custom-made, smooth and glossy 3D printed parts; in consumer goods industry; in device packaging; in spectacles/eyewear/sun glasses/custom making of aspheres and special glasses for individual specifications; for surface covers like table tops, boats, and vehicles; in optics to make high quality parts; in microfluidics to make molds and functionalized channels; miniaturized, custom-made circuit elements and electronic systems; and 3D stacked/vertical chip fabrication.

Some embodiments of a gel smoothing process include: coating an unfinished 3D printed polymer part with a curable, polymer gel (for example, UV-curable methacrylate-based gel (or other gels composed of pre-polymers based on alkyl esters of acrylic acid, where the alkyl group can include 1 to 10, 1 to 8, or 1 to 5 carbon atoms, and can optionally be substituted, and which can yield homopolymers or co-polymers based on alkyl esters of acrylic acid upon curing), epoxy-based gel, or urethane-based gel; or other UV-curable gel or heat/moisture curable gel or polymer mixture) to smooth an unfinished, rough 3D printed surface into a high quality, tough, optically smooth surface. In some embodiments, the gel also includes a phenyl ketone (or another aryl ketone) as an adhesive and sealant. The resulting smoothed optical part can be: 1) metalized by coating with aluminum or other reflective metals or dielectric coatings to produce high quality optical reflectors, in a variety of shapes which are difficult and cumbersome to manufacture by traditional machining techniques, and at a low cost, with low temperature conditions, and with low capital investment; or 2) used as a mold to form optically smooth parts from other materials shaped using the mold.

There has been an unmet demand for an effective technique to polish polymers, unlike the case for glass or metal. For 3D printed polymer parts, methods like flame polishing, acetone bath vapor polishing, applying a top coat of a polymer coating such as by spraying lacquer, and mechanical polishing with a fine-grained paper are evaluated. Spraying lacquer can yield small pinholes where a solvent evaporates from the lacquer during drying, dimensional reduction of a coating as a result of evaporation of the solvent, and also a pattern of undulations when the solvent evaporates from the coating too quickly. In contrast, little or no solvent evaporation can occur in the gel smoothing process, where a film of a gel can level itself due to surface tension effects, and is then cured. Smoothing sidewalls is evaluated using a solvent vapor. For use with a part formed of certain soluble polymers such as acrylic and polycarbonate, the part can be exposed to a solvent vapor, and the vapor can partially dissolve a surface of the part. However, this technique can deform the part as it soaks in the vapor with slight noticeable change in the flatness of the surface. This technique can render the surface to be somewhat smoother; however, as the bulk of the part is soaked in the vapor, the shape of the part can be deformed. Also, as the solvent vapor escapes, the surface can have micro-cracks, pinholes, or crazing. Further, certain 3D printing techniques use low temperature forms of polyethylene copolymers, which are generally not suitable for the solvent vapor technique, since polyethylene is chemically inert, and generally insoluble in various solvents. In contrast, the gel smoothing process is compatible with 3D printing techniques to form printed parts from both inert and chemically soluble polymers/filaments/waxes/carbon fibers/plastics/metal/wood/glass.

Coating an UV-curable gel to smooth sidewalls is found to be most effective compared to other polishing techniques. Reproducibility is desired, and the gel smoothing process is highly reproducible owing to the streamlined procedure developed. The UV-curable gel is found to yield tough films even if a similar surface roughness is attained as for polydimethylsiloxane (PDMS) smoothing. In some embodiments, the gel is an UV-curable methacrylate-based gel composed of methacrylate-based polymers and phenyl ketones (as adhesive and sealant). This polymer mixture yields high smoothness, strength, and adhesive properties. The gel's co-polymers include long chains that can stretch over imperfections of a 3D printed surface and produce an UV-cured, tough, nanometer-scale smooth surface. Two aspects are verified: the shape of a part and how the shape matched a digital file, and then a smaller-scale surface smoothness. Also another metric is the angle of metal deposition—for example, a thickness of an aluminum layer in a mirror is about 1000 Å or about 100 nm, and the angle of deposition should be substantially normal to a surface to reduce clusters and create a reflective surface. Low temperatures conditions and vacuum-compatible polymers are desired.

Once certain 3D printed parts with complex geometries have been coated and external dimensions and contours have been measured, corrections to the design of additional 3D printed parts can be performed so that additional coated parts have dimensions closer to desired finished dimensions. This can be implemented as a set of "design rules" to be used for additional parts. For example, if a film thickness on a top surface of an average part is X, then a 3D printed part can be designed with a surface that is a desired height minus X. And sharp inside or outside corners of the 3D printed part can be modified to partially offset a tendency for a gel to form a slightly larger radius on inside corners, or to pull away slightly from sharp outside corners of the 3D printed part, to be closer to the desired shape of the finished part.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

3D Printed Optics with Nanometer Scale Surface Roughness

For optics, a 3D printing fabrication approach should address three challenges: (1) a printed material can have density variations that may lead to excess scattering, (2) surfaces that are not parallel to an initial substrate can have steps corresponding to a layer thickness, and (3) a completed shape of an optical part might deviate from its design shape.

This example demonstrates a 3D printing approach that addresses these challenges. Using SLA and wax 3D printers, realization is attained of three different types of lenses: parabolic reflective lenses, lens arrays, and hemispherical lenses index matched to tissue. The complexity and multiplicity of parameters that characterize these types of optics generally have specified custom designs for all but few very large-volume applications. Optical devices have been constrained by the cumbersome, time-consuming, energy-intensive, and skill-intensive fabrication techniques to form sub-wavelength quality smooth surfaces. Optical devices by 3D printing, while maintaining or exceeding a surface quality of traditional techniques, can make fabrication much faster, scalable, and cheaper.

Printing and Surface Smoothing

Optical parts were designed and simulated with ray tracing software. Shapes were reproduced in the STL (STereo-Lithography) file format which is a standard file format of 3D printing.

Two different approaches are used to mitigate against the problem of scattering by density variations in 3D prints: reflective optics are formed with metallized surfaces, and molds are formed and used to cast polydimethylsiloxane (PDMS) lenses. That leaves the challenge of meeting criteria on surface roughness and shape, which are both strongly application dependent. For example, non-imaging optics, such as solar concentrators, specify less stringent adherence to nominal shape and smoothness, when compared to high resolution imaging systems. Generally the larger the optical aperture, the more stringent the specifications on shape and smoothness. For a wide range of applications, including solar concentrators and micro-endoscopes for in-vivo use, surface roughness and deviation from nominal shape should be less than about one twentieth of a working wavelength of an optical device, so those are the criteria used to determine whether the quality of printed optics is sufficient.

To meet the surface roughness criterion, various smoothing techniques are evaluated, including flame polish, acetone vapor polishing, spraying of polymer coatings, and mechanical polishing, but these methods did not yield nanometer smooth surfaces for optical applications. A technique is identified which best met the surface roughness criterion and which was applicable for a variety of printed parts. The technique specified coating printed optics with an ultraviolet (UV)-curable gel composed of methacrylate (polymer) and phenyl ketones (adhesive and sealant). This combination resulted in smooth, tough films that adhered well to printed surfaces. The detailed process is:

1) A 3D printed part is rinsed with water and a drop of detergent (one drop of detergent in about 500 ml).
2) The 3D printed part is washed with de-ionized (DI) water and blown dry.

3) The 3D printed part is left to substantially completely dry overnight in a low temperature oven.
4) The 3D printed part is placed in vacuum to de-gas for a few hours.
5) A thin layer of a gel (a photo-sensitive polymer mixture of the methacrylate family) is coated on a surface of the 3D printed part with a fine clean dry brush.
6) The coated part is placed in a vacuum chamber to remove any gas trapped in the 3D printed part, in the gel layer, or in between the surface of the 3D printed part and the gel layer.
7) Excess gel is removed by allowing to flow under gravity by laying the coated part flat on a stand and spinning the coated part for conformal coverage while the gel is still un-cured. 8) Excess gel is brushed off at an edge frame/support.
9) UV curing of the finished gel surface is performed for a few minutes with a time duration depending on the size of the part.
10) Repeat stage 9 to cure twice (curing in two stages to avoid over-heating).

3D Printed Reflective Lenses

Making a smoothed mirror surface from 3D printing is complicated by the criterion that the smoothness of the surface should be preserved in vacuum so that a thin metal mirror layer can be deposited. This presents a challenge for a number of 3D printing technologies and materials (for example, Projet with acrylonitrile butadiene styrene (ABS)-like thermoplastic polymer), because there is too much outgassing in vacuum to allow metallization. However Projet or other extrusion 3D printing technologies with a compatible filament material also can be used. This example focuses on Stereo-Lithography (SLA) printing technology that forms structures of polycarbonate (PC)-like thermoplastic polymers with a layer resolution of about 0.002" (about 0.0508 mm). This technology yielded printed parts without substantial outgassing, so that the UV gel smoothing process followed by metallization created smoothed mirrors with reduced pores and imperfections. A drop-on-demand printer also can be used with this smoothing process.

Figure 1B:
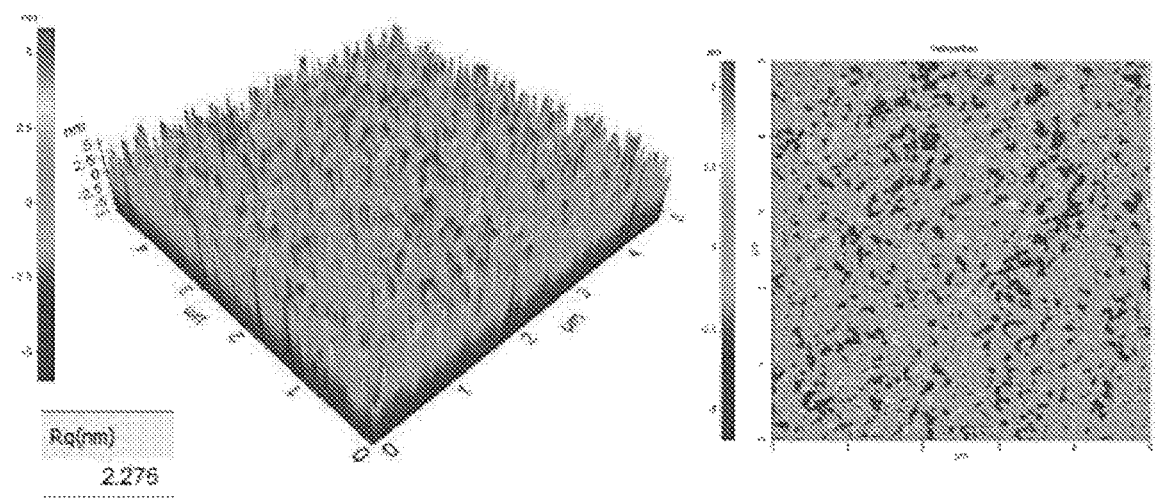
FIG. 1b: Gel smoothed 3D printed surface (surface roughness: about 2.3 nm).

To assess the quality of the mirrors at different stages of the process, surface roughness is measured using Atomic Force Microscopy (AFM) in non-contact mode over small areas, and an optical profilometer for scanning larger areas. FIG. 1a shows AFM reading of a bare 3D SLA printed surface, and FIG. 1b shows the same surface after smoothening. The as-printed bare surface has a roughness of more than about 70 nm root mean square (rms) surface roughness. The smoothening technique reduced this by more than one order of magnitude to about 2.3 nm rms, which is well within the criterion of one twentieth of a wavelength for visible and infrared light. Rms surface roughness is calculated as a root mean square of measured peaks and valleys on a surface.

Figure 2:
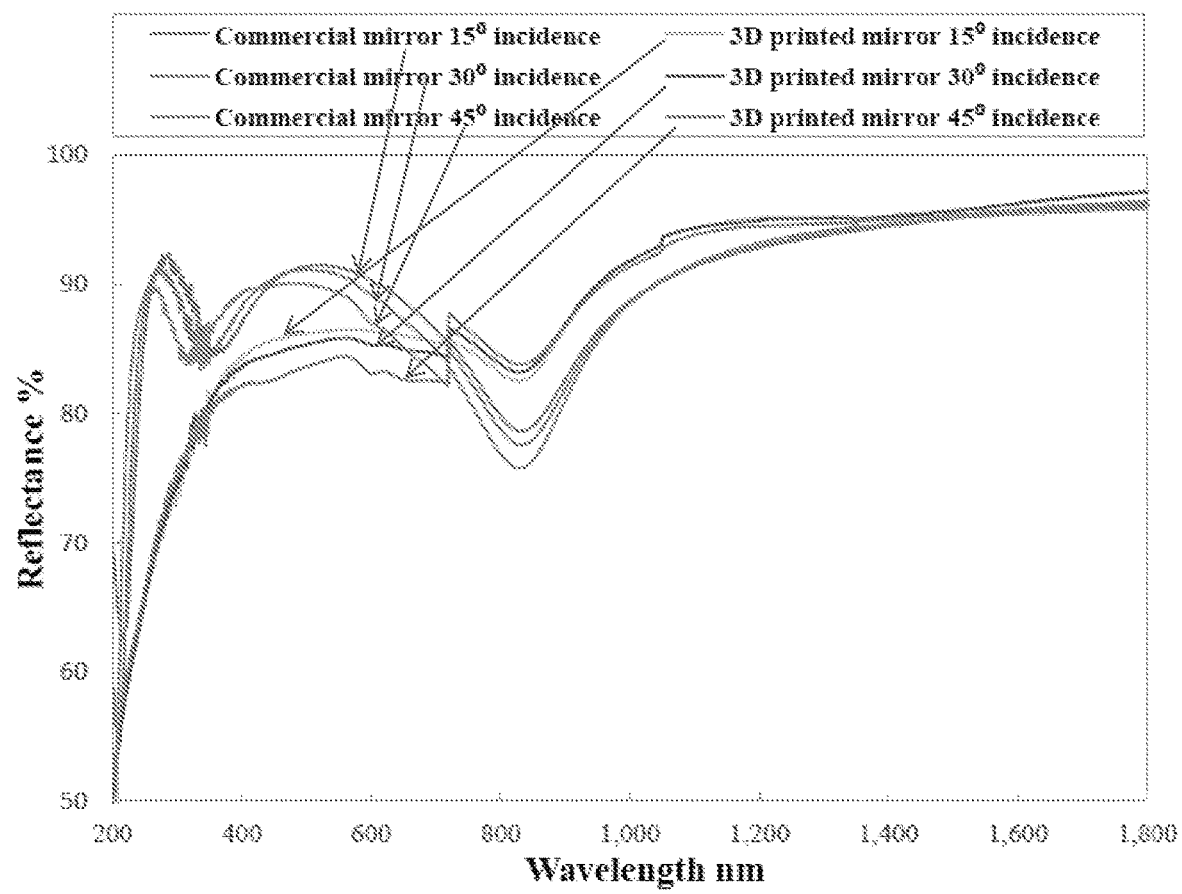
FIG. 2: Quantitative measurements performed for 3D printed mirrors. The comparison is between a commercial aluminum (Al) mirror and a 3D printed one.

After smoothening, about 150 Å of titanium (Ti) for a base seed layer followed by about 1000 Å of aluminum (Al) were evaporated onto printed surfaces and resulting mirrors were compared to commercial Al mirrors. FIG. 2 illustrates that 3D printed Al mirrors compared reasonably well to commercial Al mirrors across the 200 nm to 1,800 nm wavelength range, both measured using a spectrophotometer. Reflectivity dips exist at about 800 nm and fall off after about 300 nm, which is a property of Al inherent to Al mirrors. There are also discontinuities at points where the spectrophotometer changes a source wavelength innate to the instrument.

Figure 3:
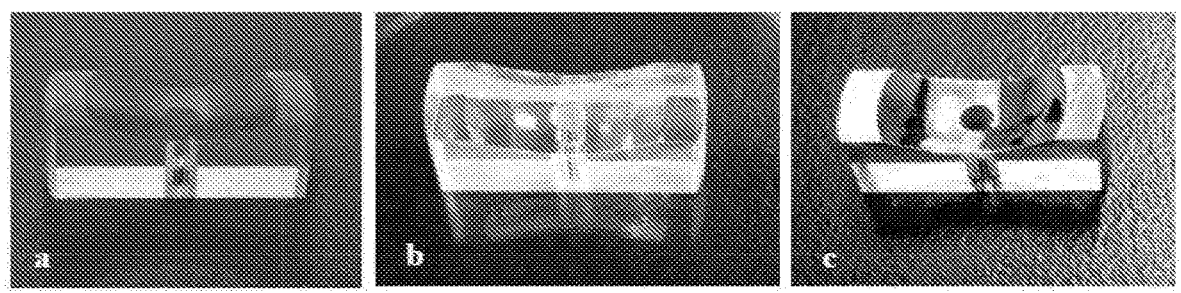
FIG. 3: Process of forming a 3D printed parabolic mirror. On the right is the finished mirror after smoothing and Al deposition.

After successfully fabricating flat smooth mirrors, the next stage was to verify that the smoothing process does not significantly change an overall shape of a printed optics. To that end a complex parabolic reflective lens is formed which is designed to be a focusing component of a dual axes confocal microscope. The mirror is typically custom made in metal using diamond turning; the cost of which is in thousands of dollars which will reduce significantly if 3D printed. FIG. 3 shows the 3D printed parabolic mirror at three different stages of completion: (a) as printed. (b) after smoothening and (c) after metallization.

The parabolic mirror is designed to have a focal length of about 6 mm, where an actual size of the mirror is about 10 mm at outer radius and with a center hole of about 1.1 mm radius. For the parabolic mirror, a wax printer with a layer thickness of about 6.3 µm was used as well as the SLA printer used before. Wax printing technology is typically used to make jewelry molds. To smoothen surfaces, the gel smoothing technique is used. A melting temperature of the wax is comparable to the polymers used in Projet and SLA printers. The wax, however, is brittle when compared to the polymers. This problem was also solved by adding the smoothing technique and tough and robust parts were made from wax parts. After UV gel coating, vacuum, spinning for conformal shape, and curing; Al was deposited (about 150 Å of Ti for a base seed layer followed by about 1150 Å of Al) on a finished smooth parabolic shape to render it reflective.

Figure 4A:
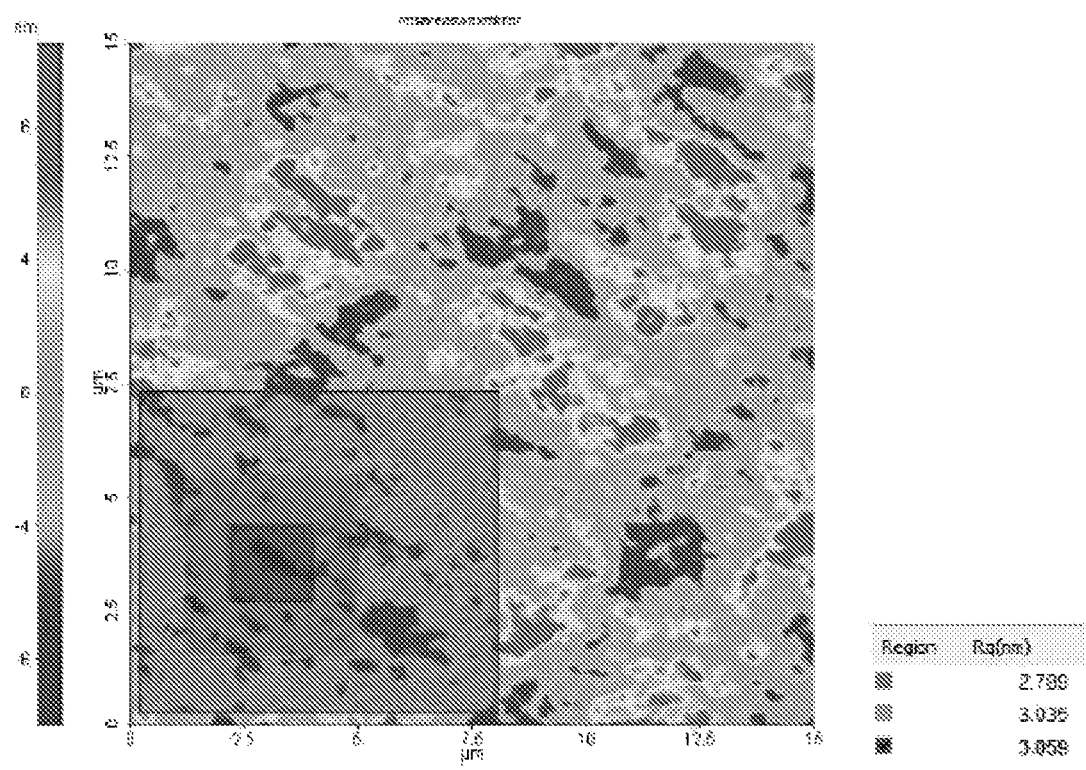
FIG. 4a, FIG. 4b, and FIG. 4c: AFM data (FIG. 4a) and profilometer measurement (FIG. 4b) on a 3D printed parabolic mirror. Uniform surface is attained with a low rms surface roughness (about 3 nm) over a larger area (140×140 square m) showing the rms value for the smoothing technique approaching an asymptotic value at large surface areas (FIG. 4c).
Figure 4B:
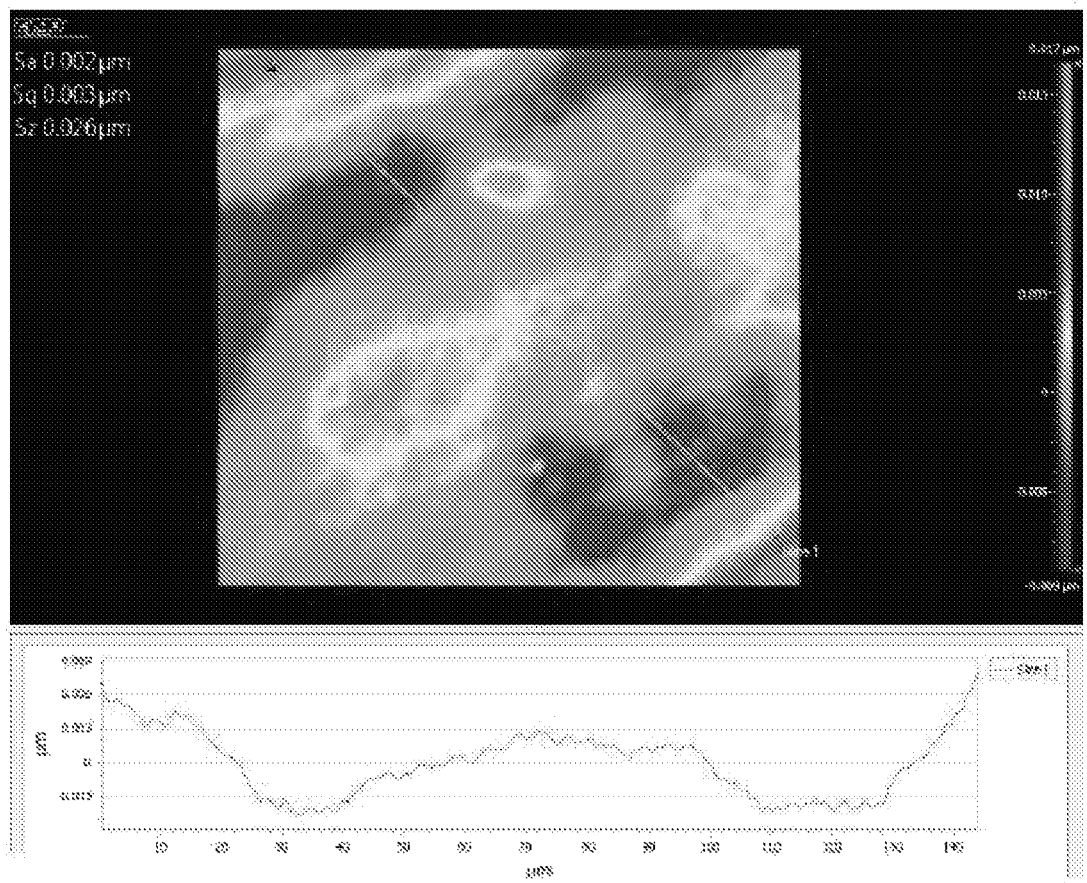
Figure 4C:
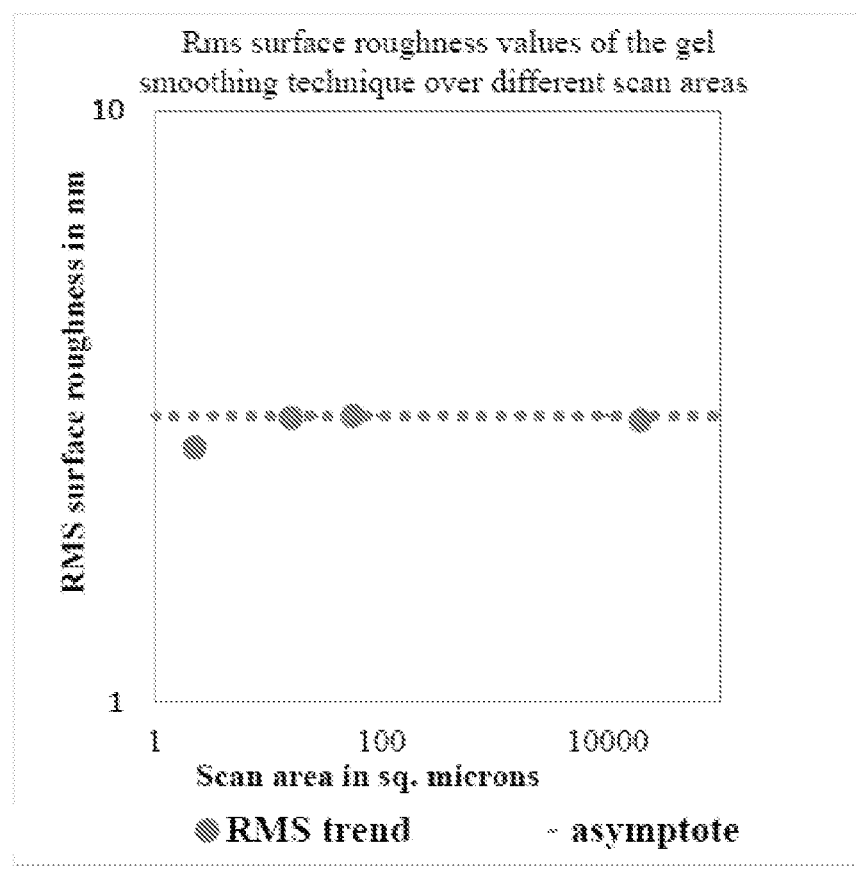

A surface roughness of the parabolic smoothed profile (FIG. 4a, rms surface roughness of about 3 nm) was compared with the bare 3D printed surface before smoothing (rms surface roughness in µm range) using AFM and also profilometer measurements over a larger area (FIG. 4b). It is found that, as a measured area increases, the rms surface roughness (Rq) seemed to reach an asymptote, namely converged to a finite value for that particular smoothing technique and material. If there are bounded outliers (like in the case of the surface here as there are no infinitely tall peaks or valleys), then a variance and hence the rms value converges to a finite value. This is demonstrated by measuring rms surface roughness over increasingly larger areas until the value converged as shown in FIG. 4c. FIG. 4 shows rms surface roughness value for gel smoothing on a 3D printed wax parabolic mirror; here, rms values are shown for different areas first done over about 15 by about 15 square µm via AFM measurement (FIG. 4a), and the rms roughness value reaches a substantially constant value of about 3 nm over an area of about 140 by about 140 square µm measured via optical profilometer (FIG. 4b). Hence, this result demonstrates that the technique does reach a rms surface roughness of a few nanometers over a large area.

Figure 5:
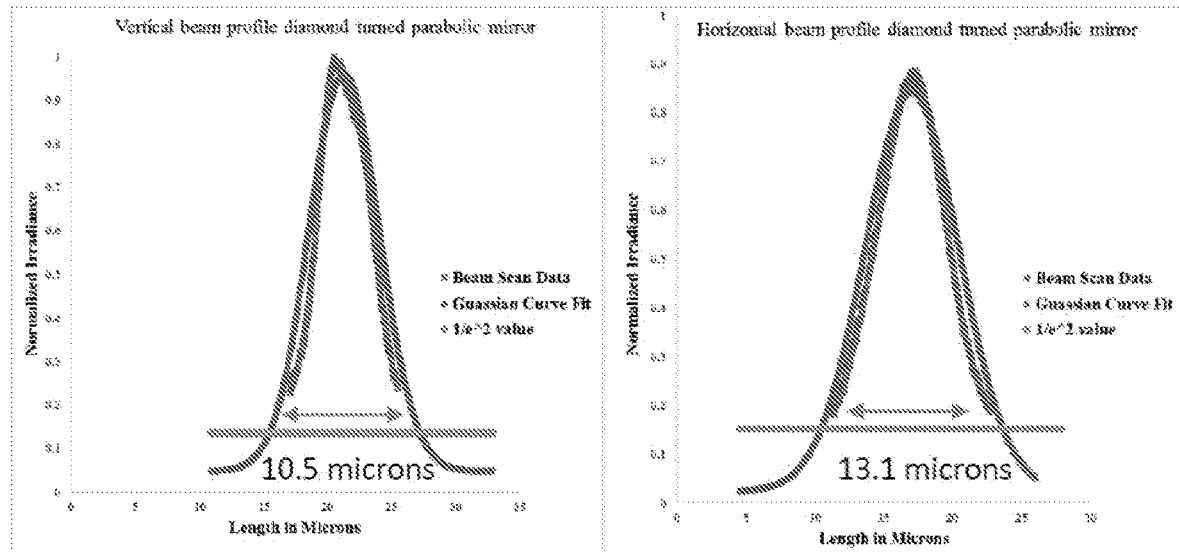
FIG. 5: Beam spot imaged from a metal diamond cut parabolic mirror and $1/e^2$ level intersection with a Gaussian beam fitting to determine a beam waist of a measured spot.
Figure 6:
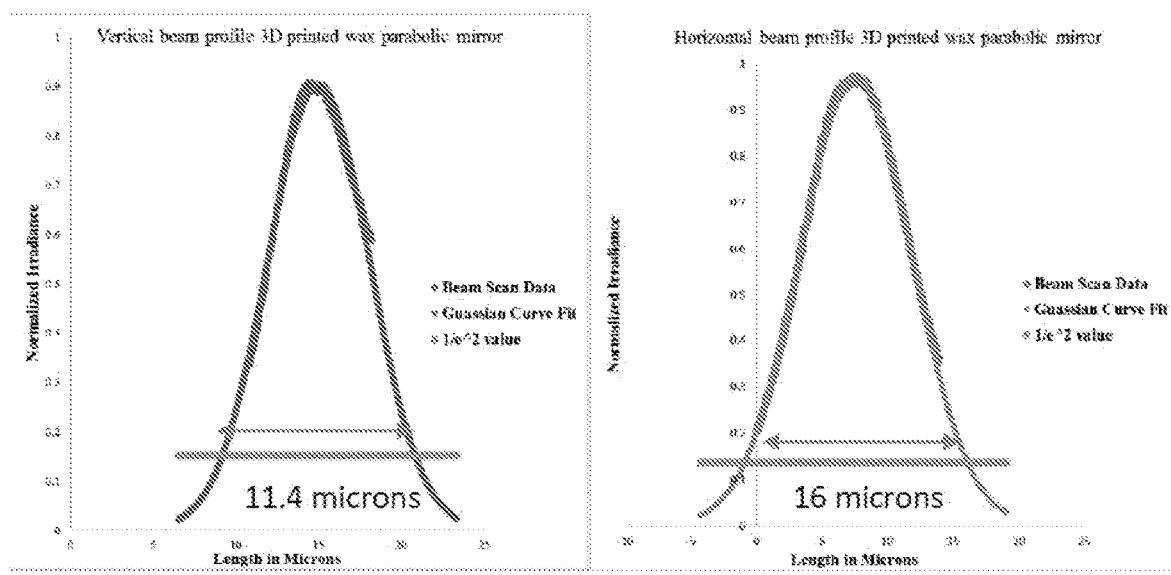
FIG. 6: Beam spot reflected from a gel smoothed wax 3D printed parabolic mirror yielded a near diffraction limited beam of about 11.4 μm by about 16 μm. A center beam data (excluding secondary lobes of small aberrations) is isolated and nonlinear regression dynamic curve fitting is performed using SigmaPlot software.

The 3D printed parabolic mirror was characterized using a beam scan with a rotating slit to measure a beam profile reflecting off the mirror. A red laser with a gradient-index (GRIN) collimator was used to illuminate and image areas on the mirror. The theoretical focal length of the parabolic mirror is about 6 mm away from the surface, so this focus was replicated using a telescope triplet lens at the eyepiece plane. The eyepiece lens in front of the beam scan magnified the beam that was produced by about one hundred times. Measured beam images from a diamond turned mirror (FIG. 5) were compared to images from the 3D printed mirror (FIG. 6) to analyze how well the 3D printing and smoothing technique worked. Due to the manner the wax 3D printer lays down material as droplets (drop on demand (DoD) technology), a more accurate parabola can be made using this printing technology and yielded improved performance than tests with mirrors made using the SLA printer. In the vertical plane, the 3D printed wax mirror created a spot size of about 11.4 µm when compared to about 10.5 µm for the diamond turned mirror (close to the diffraction limit); in the horizontal axis the beam waist measured was closer to about 16 µm when compared to about 13 µm for the diamond turned mirror. The diffraction limited spot can be analyzed using the source wavelength or an ABCD matrix analysis can be used to calculate the change in the beam parameters before and after reflection. The difference in the vertical and horizontal beam widths was recorded. As this difference is larger than the diamond turned mirror measurements, there is added astigmatism due to the 3D printed mirror shape. Apart from alignment experimental errors in the reflection measurement set up, astigmatism was caused most likely due to the manner the 3D printer lays down features; the parabolic profile parallel to a 3D printed path/sequence followed a desired analytical shape in a digital SolidWorks file. A profile shape perpendicular to the 3D printed lines can deviate from following a desired curve due to the additive nature of 3D printing. The gel smoothing, which also involved spinning before curing, was not a clear source of the astigmatism as it did not necessarily cause unevenness/ slope on the flat mirrors. The smoothing process removed textured defects on a surface to form optically smooth mirror surfaces without diffusion/scattering on the surface. However, the smoothing did not fully correct a parabolic profile printed underneath the nanometer scale texture of the surface. Nonetheless, comparison of FIG. 5 and FIG. 6 demonstrates that a close to ideal diffraction limited spot was created and the complex shape of a parabolic mirror was approximately fabricated using 3D printing.

Solar Concentrator Arrays

Figure 7:
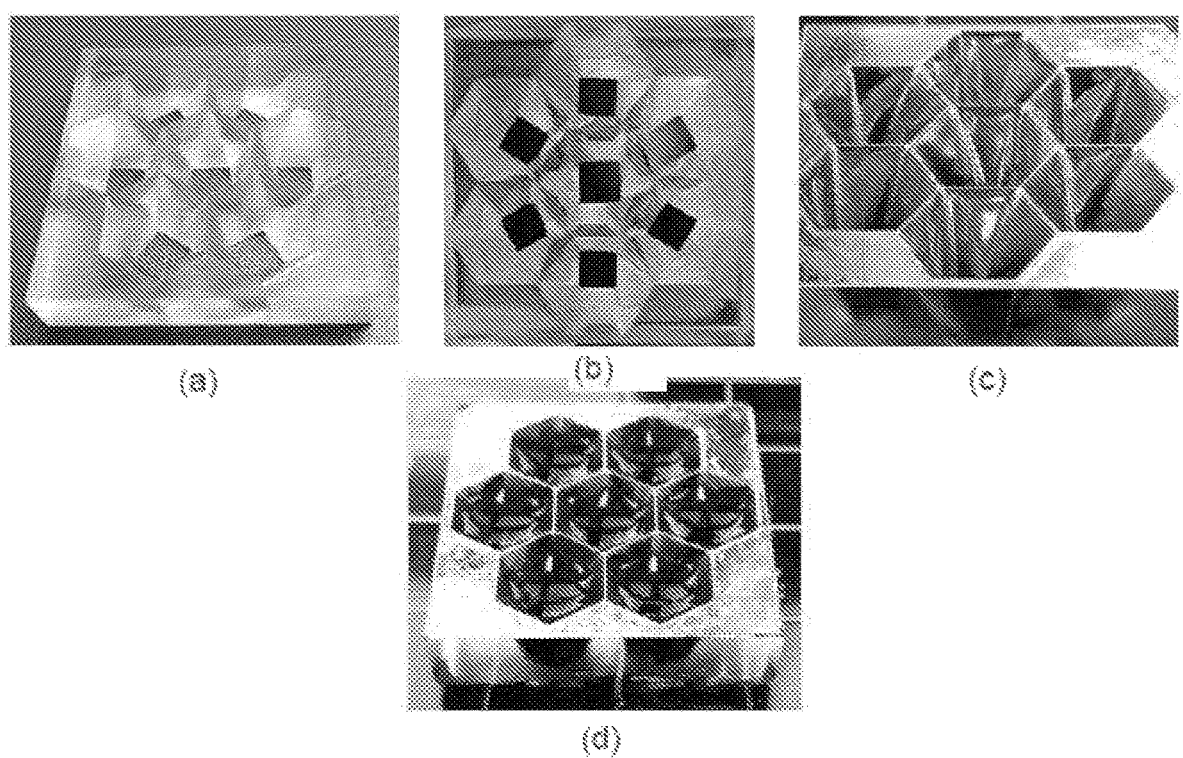
FIG. 7a, FIG. 7b, FIG. 7c, and FIG. 7d: 3D printing and smoothing process used to make a hexagonally tiled solar concentrator lens array. Complex shape of hexagons converging to squares where small square solar cells can be fitted. Mold formed via 3D printing and filled with optical UV-curable polymers to form lenses. The different images show the process flow from a bare 3D printed part to the completed concentrator.
FIG. 7e: Performance of a concentrator array formed by 3D printing.

Solar concentrators are formed using 3D printing (FIG. 7). A hexagonal tileable top surface is attained at input and then smaller square outputs are attained for bonding with solar cells with space in between creating concentration. The 3D printed structure can be used as a mold or directly as sidewall components to deposit lens layers. The 3D printed sidewalls had a roughness of the order of µm and the UV-curable gel (same as used in the above-described smoothing process) was used to render it optically smooth (value measured close to about 2 nm rms surface roughness).

The images in FIG. 7 show the transformation from start to finish of the fabrication process. The striations on the sidewalls in the manner the 3D printer builds layers are seen in FIG. 7(a). This layering and imperfections within the layers are both covered by the gel, rendering it very smooth with near optical sub-wavelength smoothness as seen in FIG. 7(b). Once Al was deposited, the part also looks very smooth (about 150 Å of Ti for a base seed layer followed by about 1150 Å of Al) and it retains the smoothness of the gel as seen in FIG. 7(c). It can be seen from left to right how the fabrication stages appear drastically different from the rough 3D printed array originally formed.

Figure 7E:
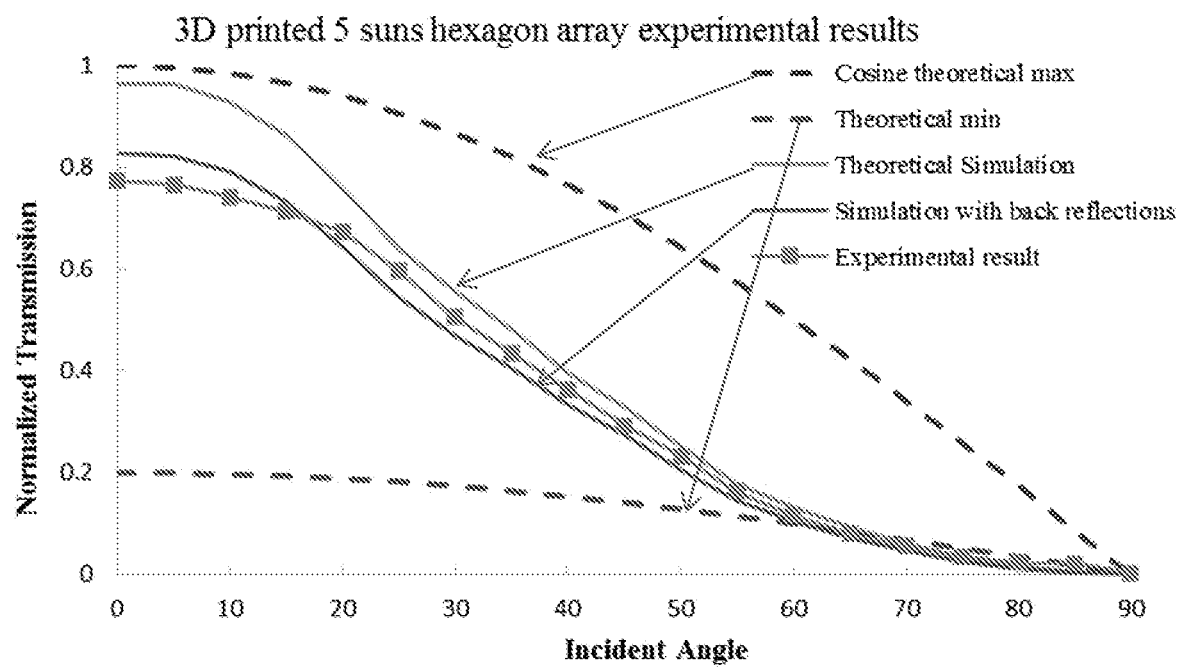

A metric of note was a thickness and an angle of the Al deposition. A normal to the surface deposition angle, especially for sidewall features/corners, was found to be effective in reducing clusters, micro-cracks, and haziness, and to form mirrors. UV-curable transparent optical polymers of refractive index of about 1.56, about 1.54, about 1.53, about 1.52, about 1.5, and about 1.46 in that order were used as graded index layers to fill the reflective mold. In the array, the hexagon at input was of side of about 6.2 mm that translated to a square output of side of about 4.5 mm, and the height of the array was about 8 mm. Due to some mixing at the boundary between a cured and a newly deposited layer, the actual index profile can be smoother than steps of discrete indices. Transmission compared to the input aperture was measured under a solar spectrum generator at different incidence angles. A non-corrosive index matching liquid of refractive index of about 1.6 was used for optical contact between the last layer of the array and the solar detector. Ray tracing simulation model included the 6 layers and the geometry of the array but not a loss at the index matching layer between the array and the solar detector. Ideally, the solar concentrator array is printed directly on a solar cell grid to yield optical and mechanical contact and immersion. Comparison between simulations and experimental results in FIG. 7e show that the array demonstrated a passive concentration of about 5 suns and followed the cosine theta theoretical maximum across incident angles (important in diffuse light conditions). The 3D printed solar concentrator array also provided an inexpensive, tileable, and robust design. The complete solar concentrator with the polymer lens array is seen in FIG. 7d.

Figure 8:
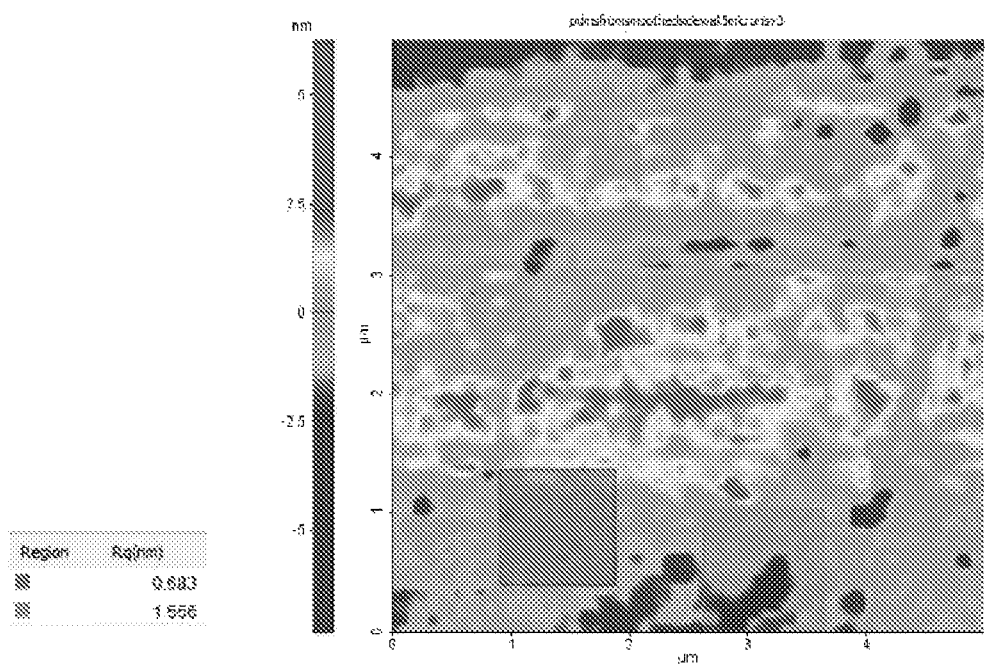
FIG. 8: AFM measurement of polydimethylsiloxane (PDMS) surface released from 3D printed smoothed index match immersion screen/lens mold. Rms surface roughness is a few nm.

3D Molding and Casting of PDMS Transparent, Index Matched Immersion Lenses 3D printed devices can have density variations due to the manner a filament is laid down on layers/substrate or a porosity formed by drops placed on top of each other forming unmatched density patterns and interfaces. Apart from reflective lenses, to avoid the scattering and loss that can result from letting light propagate through printed volumes, molds are formed. Another part of a dual axes confocal microscope is an index matching transparent immersion lens that is disposed at the output of the microscope window, where the microscope is in contact with tissue samples being imaged (lens should be index matched to tissue). The index matching screen/lens is of the order of mm (e.g., about 3 mm radius) and a material of this part should be of low refractive index to match the index of a tissue. This part also should be disposable (no cleaning involved) as it is in contact with the tissue, so that the system is sanitary. Results are next presented for PDMS transparent screens/lenses fabricated using 3D printed molds and the gel smoothing technique. The molds were made using the wax printer. These PDMS parts can be made most inexpensively for a few cents/part (disposable), have a low index of the PDMS material, and high optical transparency in the wavelengths of interest. There were two measurements here: the smoothness of the mold surface and the smoothness of the released PDMS surface. Verification is performed that the surface roughness of the PDMS parts followed the mold surface roughness via AFM measurements (FIG. 8), and reached rms surface roughness of less than about 2 nm. The material used in the molds to form the screen/lens is compatible with the smoothing gel. PDMS can be readily cured on the smooth gel mold surface and pulled away/released to form optical parts, and another result confirmed via AFM measurements was that the cured PDMS can create a replica of the smooth 3D printed surface.

DISCUSSION AND CONCLUSIONS

The fabrication technique of 3D printed parts, which form components of mirrors, lens arrays, solar concentrators, and microscopes, can be used for forming disposable/custom made/lighter/cheaper optical systems. A method of forming molds/shapes is by using PDMS to create a replica of a mold and then pouring polyurethane (a strong and robust polymer) to reproduce its surface. This replicating process can be used to make complicated shapes/molds with 3D printing technology to form inexpensive, nanometer scale smooth, accurate, and durable polyurethane molds/parts in large volumes.

This example has demonstrated the fabrication of optical devices using 3D printing and the smoothing technique and satisfied the wavelength/20 surface roughness criterion for optical fabrication. Flat reflective lenses, parabolic mirrors, and solar concentrator lens arrays were formed using 3D printing. Additionally, molds were formed with this versatile fabrication method. It is found that, for the smoothing technique, as the measured area increased, the rms surface roughness reached an asymptote. The results show the effectiveness of the smoothing/finishing technique introduced that can render 3D printed polymer surfaces smooth/mirror-like with sub-wavelength surface roughness for optical applications. This example reports an about 2 nm surface roughness (high quality optics) in the optical parts using 3D printers without using expensive tools, processing, or materials. Apart from optical device fabrication, other applications where the UV gel smoothing process can be used include: 3D printing applications where the gel can be a finishing stage for various types of smooth and glossy 3D parts, in consumer goods, device packaging, molds for spectacles/eyewear/sun glasses/custom making of aspheres, in microfluidics to form molds and functionalized channels, tiny custom made circuit components and electronic systems, 3D stacked/vertical chip fabrication using 3D printing, and so forth.

In summary:

1. Surface roughness in 3D printed optics was overcome by UV gel smoothing technique that formed nanometer smooth surfaces.

2. Density variations in 3D printed optics that can lead to excess scattering were addressed by forming reflective mirrors and lens molds.

3. A completed shape of 3D printed part and its potential deviation from a digital design was evaluated by experimental methods and it is found that approximate shapes were formed. Depending on application specifications, printing and smoothing parameters can be further refined.

4. SLA and wax printing yielded desirable optical devices.

5. Imaging results of 3D printed parabolic mirrors were comparable to a diamond turned metal mirror, PDMS lenses index matched to tissue were formed using 3D printed molds, solar concentrator hexagonal arrays were formed using 3D printing and demonstrated about 5 suns concentration.

6. 3D printed optics can be readily fabricated at low cost, have design flexibility and customization, are light weight, and are low on material waste due to the additive nature of 3D printing.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A fabrication process comprising:
   forming an object by 3D printing having a first rms surface roughness;
   smoothing the object by applying a gel to the object to coat at least a portion of the object with a film of the gel;
   subjecting the object coated with the film to vacuum; and
   curing the film to yield the object coated with the cured film,
   wherein the cured film has a second root mean square (rms) surface roughness that is 100 nm or less and wherein the first rms surface roughness is at least 10 times greater than the rms surface roughness of the cured film.

2. The fabrication process of claim 1, wherein a root mean square (rms) surface roughness of the cured film is 20 nm or less to attain an optical quality surface.

3. The fabrication process of claim 2, wherein the rms surface roughness of the cured film is 10 nm or less.

4. The fabrication process of claim 1, wherein forming the object is performed by 3D printing with a Stereo-Lithography printer or a wax printer.

5. The fabrication process of claim 1, further comprising, prior to applying the gel, cleaning the object and subjecting the object to vacuum.

6. The fabrication process of claim 1, wherein the gel is composed of a pre-polymer based on an alkyl ester of acrylic acid.

7. The fabrication process of claim 1, wherein the gel is a methacrylate-based gel.

8. The fabrication process of claim 1, wherein applying the gel is performed using an applicator.

9. The fabrication process of claim 1, wherein applying the gel is performed by spin-coating, deposition, spaying, screen printing, dropping, dipping, or painting.

10. The fabrication process of claim 1, wherein subjecting the object coated with the film to vacuum is performed at a pressure of $10^{-1}$ Torr or less.

11. The fabrication process of claim 1, wherein curing the film is performed by exposing the film to light or heat.

12. The fabrication process of claim 1, further comprising depositing a metal layer over the cured film to form an optically smooth mirrored surface.

13. The fabrication process of claim 1, wherein the object coated with the cured film is a mold, and further comprising forming a molded object using the mold.

14. An optical device or an optical device mold formed by the fabrication process of claim 1, wherein the optical device comprises a reflective lens, a refractive lens, an optically smooth mirrored surface, or a combination thereof.

15. An optical device formed by the fabrication process of claim 1, wherein the optical device comprises a reflective lens, a refractive lens, an optically smooth mirrored surface, or a combination thereof.

16. An optical device comprising:
an object; and
a polymer film coating the object and having a root mean square (rms) surface roughness of 100 nm or less,
wherein the object is an object having a rms surface roughness of at least 10 times greater than the rms surface roughness of the polymer film and
wherein the optical device comprises a reflective lens, a refractive lens, an optically smooth mirrored surface, or a combination thereof.

17. The optical device of claim 16, wherein the object is a 3D printed object.

18. The optical device of claim 16, wherein the rms surface roughness of the polymer film is 10 nm or less.

19. The optical device of claim 16, further comprising a metal layer coating the polymer film, wherein the optical device is a reflective lens comprising an optically smooth mirrored surface.

20. The optical device of claim 16, wherein the polymer film is composed of a polymer based on an alkyl ester of acrylic acid.

* * * * *